United States Patent [19]

Irmer et al.

[11] Patent Number: 5,440,302
[45] Date of Patent: Aug. 8, 1995

[54] APPARATUS FOR CONTACTLESS DATA AND ENERGY TRANSMISSION AND SYSTEMS CONTAINING THE APPARATUS

[75] Inventors: Heimbert-Ulrich Irmer, Haar; Bruno Scheckel, Ebersberg, both of Germany

[73] Assignee: Siemens Aktiengesellschaft, Munich, Germany

[21] Appl. No.: 210,074

[22] Filed: Mar. 17, 1994

Related U.S. Application Data

[63] Continuation of Ser. No. 956,550, Oct. 2, 1992, abandoned, which is a continuation of Ser. No. 590,088, Sep. 28, 1990, abandoned.

[30] Foreign Application Priority Data

Jul. 16, 1990 [EP] European Pat. Off. ........... 90113587

[51] Int. Cl.⁶ ..................... G06K 7/08; G08C 17/00
[52] U.S. Cl. .................. 340/870.31; 340/825.34; 340/825.54; 235/380
[58] Field of Search ........... 340/870.31, 870.3, 870.32, 340/825.34, 825.54, 825.72, 572; 455/41, 60; 342/44, 51; 235/380

[56] References Cited

U.S. PATENT DOCUMENTS

| 4,549,176 | 10/1985 | Kreft | 340/825.54 |
| 4,697,183 | 9/1987 | Jenning et al. | 340/870.25 |
| 4,749,993 | 6/1988 | Szabo et al. | 340/870.31 |
| 4,796,028 | 1/1989 | Mackenthun et al. | 340/825.58 |
| 4,818,855 | 4/1989 | Mongeon et al. | 340/825.54 |
| 4,857,893 | 8/1989 | Carroll | 340/825.54 |
| 4,928,087 | 5/1990 | Kreft et al. | 340/870.31 |

FOREIGN PATENT DOCUMENTS

| 1183927 | 12/1985 | Canada . |
| 0309201 | 3/1989 | European Pat. Off. . |
| 3149789 | 8/1983 | Germany . |
| 3225039 | 1/1985 | Germany . |
| 3221356 | 3/1987 | Germany . |
| 3614477 | 5/1988 | Germany . |
| 3447560 | 8/1988 | Germany . |
| 3810702 | 10/1989 | Germany . |
| 62-297988 | 12/1987 | Japan . |

OTHER PUBLICATIONS

Publication, Patent Abstracts of Japan, vol. 12, No. 192 (P-712)[3039], Jun. 4, 1988; JP-A-62-297988, Dec. 25,1987 (Abstract only); English.

Publication Laboratory Report No. HTV 8902/HDP 8902, entitled "C2 Card", Rainer Imjela of Philips Components, dated Oct. 11, 1989, VALVO Philips Bauelemente, Jan. 1990.

*Primary Examiner*—Brent Swarthout
*Assistant Examiner*—Andrew M. Hill
*Attorney, Agent, or Firm*—Herbert L. Lerner; Laurence A. Greenberg

[57] ABSTRACT

An apparatus for contactless data and energy transmission includes a stationary part and a movable part. The stationary part includes coils and an oscillator connected to the coils for contactless power transmission and data transmission to the movable part. The oscillator produces a reference oscillation as well as an information oscillation upon which a phase displacement relative to the reference oscillation is imposed as a function of data to be transmitted. The movable part includes other coils. One of the coils of each of the parts forms a first pair of coils through which the phase-displaced oscillation is supplied and another of the coils of each of the parts forms a second pair of coils through which the reference oscillation is supplied to the movable part. The movable part also includes a demodulator circuit connected to the other coils for receiving transmitted oscillations and recovering the data from the phase displacement. According to one embodiment, only one of the pairs of coils provide power transmission, and data transmission from the movable part to the stationary part is provided by load variation only at the coil of the movable part not being used for power transmission. According to another embodiment, data transmission from the movable part to the stationary part is provided by load variation of only one of the pairs of coils, and power transmission is only provided by the pair of coils not undergoing any load variation caused by the data transmission from the movable part to the stationary part at a given moment.

6 Claims, 2 Drawing Sheets 5,440,302

1

APPARATUS FOR CONTACTLESS DATA AND ENERGY TRANSMISSION AND SYSTEMS CONTAINING THE APPARATUS

This application is a continuation of application Ser. No. 07/956,550, filed Oct. 2, 1992, abandoned, which is a continuation of application Ser. No. 07/590,088, filed Sep. 28, 1990, abandoned.

BACKGROUND OF THE INVENTION

1. Field of the Invention

The invention relates to an apparatus for contactless data and energy transmission and systems using the apparatus, the apparatus including a stationary part having an oscillator for contactless power transmission to a movable part with the aid of a pair of coils, the oscillation of the oscillator being split into a reference oscillation and an information oscillation, a phase displacement relative to the reference oscillation being forced or imposed upon the information oscillation as a function of the data to be transmitted, the phase-displaced oscillation being supplied through a first pair of coils and the reference oscillation being supplied through a second pair of coils to the movable part, in the movable part the transmitted oscillations being supplied to a demodulator circuit recovering the data from the phase displacement, and a data transmission from the movable part to the stationary part being provided by a load variation.

2. Description of the Related Art

Such an apparatus is described in German Patent DE-PS 34 47 560 C2, corresponding to U.S. Pat. No. 4,697,183, particularly in the description thereof pertaining to FIGS. 1 and 2. Such an apparatus is also known from an article in a publication known as Laboratory Report No. HTV 8902/HDP 8902, entitled "C2 Card" by Rainer Imjela of Philips Components, dated Oct. 11, 1989, which was published in German as Laborbericht C2-Card in January 1990 by Valvo/-Philips Bauelemente, and particularly from FIG. 4 on page 27 thereof. Subcircuits of apparatuses of that generic type are described in German Patent DE-PS 31 49 789 C1, corresponding to Canadian Patent No. 1,183,927, German Patents DE-PS 32 21 356 C2, 32 25 039 C2, and 36 14 477 C2, the latter corresponding to U.S. Pat. No. 4,796,028, and German Published, Non-Prosecuted Application DE-OS 38 10 702 A1.

German Patent DE-PS 34 47 560 C2 describes an apparatus for contactless data and energy transmission, including a stationary part called a microstation, having an oscillator for contactless power transmission with the aid of at least one pair of coils, but typically with two pairs of coils to a movable part called the microunit. In the apparatus described therein, two coils are provided in the stationary part, which form a total of two pairs of coils with two coils in the movable part. The data transmission from the movable part to the stationary part is effected by simultaneous change of load at both coils of the movable part, which assures that proof of the change of load is possible at one of the two coils of the stationary part even if the combinations making up the coil pairs are transposed. The oscillation of the oscillator in the stationary part is split into two separate oscillations (a reference oscillation and an information oscillation). The first oscillation (information oscillation) is compelled to undergo a phase displacement relative to the other reference oscillation serving as a reference variable, as a function of the data to be transmitted. The out-of-phase oscillation is supplied to the movable part through one of the pairs of coils, and the other oscillation is supplied to it through the other pair of coils. The power transmission is effected with the aid of the two oscillations, through both pairs of coils. In the movable parts, the oscillations being transmitted are supplied to the demodulator in the form of a phase comparator, which recovers the data from the phase displacement.

The stationary unit described in German Patent DE-PS 34 47 560 C2 includes an oscillator having an output frequency which is furnished through respective flip-flops of different edge control, to two outputs. Therefore, two signals of the same frequency, which are in quadrature, are furnished. Those two signals are each connected to one coil, and each of the coils in the stationary part, together with one coil in the movable part, forms a coil pair. The phase position of the signal applied to one of the coils is displaceable by 180°. As a result, the phase position can be switched back and forth by ±90° between the two signals transmitted in the two coil pairs. The signal transmission from the stationary part to the movable part can thus be effected with the aid of 2 PSK (phase-shift keying, with two possible phase states). The movable part of the apparatus for contactless data and energy transmission, which is shown in the form of a block circuit diagram in FIG. 2 of German Patent DE-PS 34 47 560 C2, is essentially identical to the functional block circuit diagram of the movable part of an apparatus for contactless data and energy transmission shown on page 7 of the aforementioned German version of the C2 Card Laboratory Report. The signal is picked up at one of the connection terminals of each of the two coils present in the movable part and each is carried to one input of a demodulator circuit. The demodulator circuit passes on the signal sent by the stationary unit to subsequent circuit units. The demodulator circuit is followed by a circuit unit that defines the logic level of the signal at the turn-on instant of the movable part. Each time the movable part is turned on, a previously defined level, either high or low, is sent for a predetermined period of time for that purpose. When the movable part is turned on, the circuit part required for defining the level is reset, and then it defines the logic level of the movable part as a function of the predetermined sent signal. The two connection terminals of the two coils contained in the movable part are each followed by one rectifier. The output furnishing the positive voltage of one of the rectifiers is interconnected with the output furnishing the positive voltage of the other of the rectifiers, and the two output terminals each furnishing the negative voltage of the two rectifiers are also connected to one another. The common output of the two rectifier circuits is connected to both a variable load and a voltage regulator for furnishing the operating voltage of the movable part. The variable load is triggered in such a way that it primarily varies the real portion of the input impedance of the movable part of the apparatus for contactless data and energy transmission, as a function of the data to be transmitted from the movable part to the stationary part. Among other examples of a variable load is a synchronous switch which is open or closed as a function of the data to be transmitted and thus can connect a further impedance parallel to the input impedance of the movable part present in the open state of this switch.

Given suitable triggering, the variable load acts as an amplitude modulator.

If the information oscillation is switched over between a +90° and −90° phase displacement, the oscillation amplitude at the coil of the stationary part being acted upon by the information oscillation moves toward zero at the instant of changeover, for a predetermined period of time. The energy supply of the movable part must be provided for this period of time by one pair of coils alone. If the coils of the movable part are capable of arbitrarily forming pairs of coils with the coils of the stationary part for the contactless data and energy transmission, then at least the coil of the stationary part transmitting the reference oscillation and both coils of the movable part, along with both rectifier configurations of the movable part, must be dimensioned in terms of their power capacity in such a way that they are suited for supplying all of the energy required by the movable part. The voltage regulator, for instance a series regulator, that follows the two rectifier circuits having outputs which are connected in parallel, must have a limit frequency that is higher than the data transmission rate of the amplitude modulator. It is only in this way that the jumps in potential, impressed by the amplitude modulator, at the input of the voltage regulator can be stabilized. It is therefore recommended that the voltage regulator that maintains the energy supply to the movable part have a limit frequency that is on the order of magnitude of the signal frequency of the oscillator in the stationary part, if the amplitude modulation is to superimpose a reliably detectable square signal upon the carrier frequency defined by the oscillator. Thus in such circuit configurations the data transmission rate from the movable part to the stationary part is defined by the limit frequency of the voltage regulator. At high data transmission rates, the voltage regulator is correspondingly expensive to manufacture.

At a given transmission characteristic for the signal transmission from the movable part to the stationary part, for example an amplitude rise in the movable part of 4 V, which is equivalent to a required load rise in the stationary part, a minimum allowable input voltage of the voltage regulator in the movable part that is increased by the amount of the amplitude rise is needed in order to furnish a required output voltage. In known contactless data and energy transmission apparatuses, the minimum allowable value of the voltage furnished by the coils at the input to the movable part must be higher than the required output voltage of the voltage regulator by an amount equal to the sum of the voltage dropping at the bridge rectifier, the minimum voltage dropping across the voltage regulator, and the amplitude rise. For instance, for an amplitude rise of 4 V, in order to obtain an output voltage of 5 V at the voltage regulator, the input voltage must typically be higher than 11 V. In monolithically integrated circuits, an integrated circuit that is supplied with an operating voltage of 5 V will accordingly also contain components having a breakdown voltage of over 11 V.

It is accordingly an object of the invention to provide an apparatus for contactless data and energy transmission and systems containing the apparatus, which overcome the hereinafore-mentioned disadvantages of the heretofore-known devices of this general type, which are also suitable for higher data transmission rates, and in which the movable part does not require as high an input voltage as in known apparatuses in order to furnish a certain operating voltage to the movable part.

SUMMARY OF THE INVENTION

With the foregoing and other objects in view there is provided, in accordance with the invention, an apparatus for contactless data and energy transmission, comprising a stationary part and a movable part, the stationary part including coils and an oscillator connected to one of the coils for contactless power transmission to the movable part, the oscillator producing an oscillation being split into a reference oscillation as well as an information oscillation upon which a phase displacement relative to the reference oscillation is imposed as a function of data to be transmitted being connected to the other of the coils, the movable part including other coils, one of the coils of each of the stationary and movable parts forming a first pair of coils through which the phase-displaced oscillation is supplied and another of the coils of each of the stationary and movable parts forming a second pair of coils through which the reference oscillation is supplied to the movable part, and the movable part also including a demodulator circuit connected to the coils of the movable part for receiving transmitted oscillations and recovering the data from the phase displacement, only one of the pairs of coils providing power transmission, and data transmission from the movable part to the stationary part being provided by load variation only at the coil of the movable part not being used for power transmission.

With the objects of the invention in view there is also provided an apparatus for contactless data and energy transmission, comprising a stationary part and a movable part, the stationary part including coils and an oscillator connected to one of the coils for contactless power transmission to the movable part, the oscillator producing an oscillation being split into a reference oscillation as well as an information oscillation upon which a phase displacement relative to the reference oscillation is imposed as a function of data to be transmitted being connected to the other of the coils, the movable part including other coils, one of the coils of each of the stationary and movable parts forming a first pair of coils through which the phase-displaced oscillation is supplied and another of the coils of each of the stationary and movable parts forming a second pair of coils through which the reference oscillation is supplied to the movable part, the movable part also including a demodulator circuit connected to the coils of the movable part for receiving transmitted oscillations and recovering the data from the phase displacement, data transmission from the movable part to the stationary part being provided by load variation of only one of the pairs of coils, and power transmission being provided only by the pair of coils not undergoing any load variation caused by the data transmission from the movable part to the stationary part at a given moment.

In accordance with another feature of the invention, there are provided rectifier circuits each being associated with a respective one of the other coils, voltage regulators having control elements each being associated with a respective one of the other coils, and modulator circuits each being associated with a respective one of the other coils.

In accordance with a further feature of the invention, there are provided rectifier circuits each being associated with a respective one of the other coils, voltage regulators each being associated with a respective one of the other coils, and modulator circuits each being associated with a respective one of the other coils.

In accordance with an added feature of the invention, the stationary and movable parts are parts of a data exchange system and the movable part is part of a key or part of a chip card.

In accordance with a concomitant feature of the invention, the stationary and movable parts are parts of an access system and the movable part is part of a key or part of a chip card.

An apparatus for contactless data and energy transfer according to the invention differs from a known apparatus as described above primarily in that the power transmission is effected with the aid of only one coil pair, and that the data transmission from the movable part to the stationary part is effected only by a load change at the coil of the movable pair that does not serve to transmit power. This assures that an amplitude modulation that would have to be stabilized by this voltage regulator is not furnished directly at the input to the voltage regulator for furnishing the operating voltage of the movable part. Accordingly, the data transmission rate is not limited by the limit frequency of the voltage regulator of the movable part. In apparatuses for contactless data and energy transmission according to the invention the power transmission should be effected with the aid of the oscillation of the coil pair that transmits the reference oscillation, in order to assure that a brief absence of the information oscillation upon each switchover in phase will not cause power failures in the movable part.

According to a feature of the invention, in order to assure that the coils of the stationary part can be arbitrarily oriented with the coils of the movable part to form coil pairs, in addition to a rectifier circuit, associated with each of the two coils of the movable part is at least the final control element of a voltage regulator as well as at least one switch, which can vary the load of the coil pair associated with it as a function of its triggering and the resultant switch position. A voltage regulator and a variable load may also be associated with each of the coils, or only one voltage regulator and only one variable load may be provided, which can be selectively connected to the output side of the coils of the movable part by being switched over. In all of these cases, it must be assured through a logical linkage that the amplitude modulator required for the data transmission from the movable part to the stationary part will always vary the load of the coil pair which is not involved at all in the energy transmission and which has the voltage regulator or voltage regulator final control element which is consequently not activated, or in other words the particular coil pair which is not followed by the voltage regulator.

If the coils of the movable part and the coils of the stationary part are to be coupleable arbitrarily and therefore if a demodulator circuit as described above is provided with a circuit unit for defining the logic level of the signal, then this circuit unit, in the same way in which it defines the logic level, can also detect to which of the coils of the movable part the reference oscillation, and to which of the coils of the movable part the information oscillation that is variable in its phase position with respect to the reference oscillation, are to be transmitted. In accordance with the invention, in such an apparatus for contactless data and energy transfer, as a function of a signal of the demodulator circuit containing this information, a logical linkage defines which coil of the movable part is used for the data transmission from the movable part to the stationary part, and which coil is used for the energy transmission. This assures that the data transfer from the movable part to the stationary part is effected with the aid of the particular coil of the movable part which at the moment is not being used for energy transmission. In order to assure a continuous supply of energy to the movable part, the coil transmitting the reference voltage in this case is followed by a voltage regulator, or a voltage regulator connected to the output side of this coil is activated, and for the data transfer from the movable part to the stationary part, the load at the coil of the movable part that is transmitting the information oscillation is varied as a function of the data to be transmitted.

Other features which are considered as characteristic for the invention are set forth in the appended claims. Although the invention is illustrated and described herein as embodied in an apparatus for contactless data and energy transmission and systems using the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
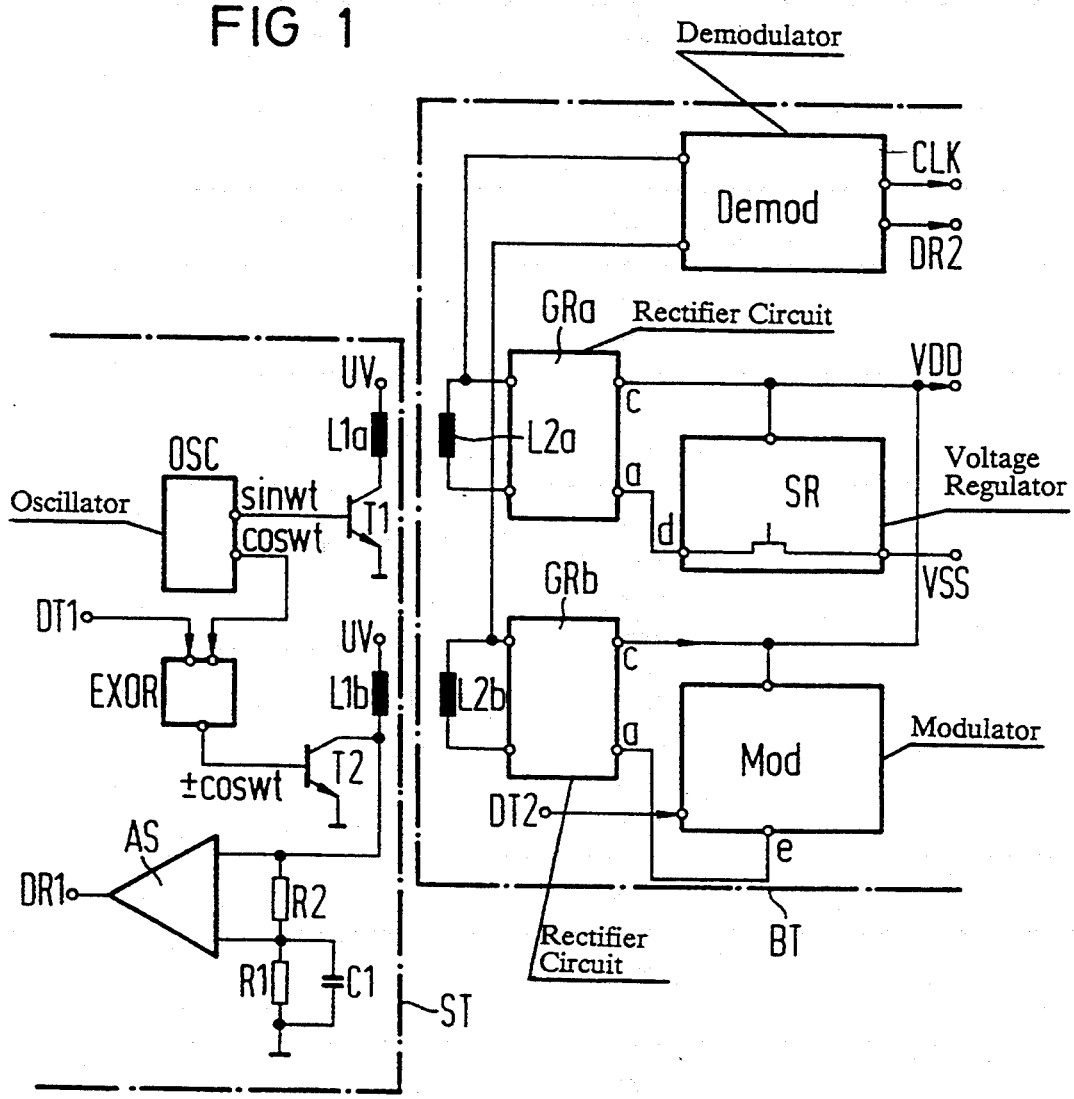
FIG. 1 is a basic schematic and block circuit diagram of an embodiment of an apparatus according to the invention for contactless data and energy transmission, including a stationary part ST and a movable part BT, wherein the stationary part has two repeating coils L1a and L1b, and the movable part also has two repeating coils L2a and L2b, and the repeating coils of the stationary part are fixedly associated with the repeating coils of the movable part to form pairs of coils.

Referring now to the figures of the drawing in detail and first, particularly, to FIG. 1 thereof, there is seen a stationary part ST, having a repeating coil L1a with a first terminal being connected to a first supply potential UV and a second terminal which can be connected through a switch, in particular a transistor T1, to a second supply potential, particularly ground. The switch T1 is triggered by a first output sinwt of an oscillator OSC. In addition to the first output sinwt, the oscillator OSC has a second output coswt. The signal furnished at the output coswt has a fixedly defined phase relation, for instance a 90° phase position, or quadrature, relative to the signal furnished at the output sinwt. The output coswt of the oscillator OSC is connected to one input of an EXCLUSIVE OR gate EXOR. The other input of the EXCLUSIVE OR gate EXOR can be acted upon with binary data through a data input terminal DT1. If a low level is present at the data input terminal DT1, then the signal at an output ±coswt of the EXCLUSIVE OR gate EXOR is equivalent to the signal at the output coswt of the oscillator OSC. If a high level is present at the data input terminal DT1, then the signal furnished at the output ±coswt of the EXCLUSIVE OR gate EXOR is equivalent to the signal at the output coswt of the oscillator OSC, but phase-displaced by 180°. In the exemplary embodiment of FIG. 1, the EXCLUSIVE OR gate EXOR which is shown thus serves as a particular form of phase modulator. The output signal of the EXCLUSIVE OR gate EXOR controls a switch, in particular a transistor T2, which can connect one terminal of the repeating coil L1$b$ to the second reference potential, in particular ground. The other terminal of the repeating coil L1$b$ is acted upon by the supply potential UV. The terminal of the repeating coil L1$b$ which through the switch T2 can be connected to the reference potential or ground, is connected to a first input of an evaluation stage AS and it is also connected through a resistor R2 to a second input of the evaluation stage AS. The second input of the evaluation stage AS is also connected to the reference potential or ground, through a parallel circuit of a resistor R1 and a capacitor C1. The output of the evaluation stage AS forms a data output terminal DR1.

FIG. 1 also shows that each of the two repeating coils L2$a$, L2$b$ of the movable part BT is followed by a respective rectifier circuit GRa, GRb, with a demodulator Demod, a voltage regulator SR and a modulator or modulator final control element Mod. The demodulator Demod, which typically includes a phase detector and possibly a circuit for defining the logic level, has two inputs. One of the inputs of the demodulator Demod is connected to one terminal of the repeating coil L2$a$ and the other input thereof is connected to one terminal of the other repeating coil L2$b$. The demodulator circuit Demod has an output terminal CLK, which furnishes a clock signal for circuit elements following the transmission device of the movable part, such as logic circuits or a processor, as a function of the signal received by the repeating coils. The demodulator circuit Demod also has an output terminal DR2, at which the data which have been input through the data input terminal DT1 in the stationary part and modulated upward by the phase modulator being in the form of the EXCLUSIVE OR gate EXOR and having the carrier frequency furnished by the oscillator OSC, are furnished in demodulated form. Each of the two connection terminals of the repeating coil L2$a$ is connected to a respective alternating current input of the rectifier circuit GRa. Each of the two connection terminals of the repeating coil L2$b$ is connected to a respective alternating current input of the rectifier GRb. The rectifier circuits GRa and GRb each have an output terminal c. The two output terminals c are interconnected and they furnish a reference potential VDD for the electronic circuits included in the movable part, such as the voltage regulator SR and the modulator Mod. One output terminal a of the rectifier circuit GRa is interconnected with one input terminal d of the voltage regulator SR. The output terminal of the voltage regulator SR furnishes a supply potential VSS for the electronic circuits of the movable part BT. If the voltage regulator SR is a negative voltage regulator, then the reference potential VDD is higher than the supply potential VSS.

If the voltage regulator SR is a positive voltage regulator, then the supply potential VSS is higher than the reference potential VDD. The outputs terminals a, b and c of the rectifier configurations GRa and GRb should be defined as a function thereof, by means of a suitable winding direction. One output terminal b of the rectifier circuit GRb is interconnected with one input terminal e of the modulator circuit Mod. As shown in FIG. 1, the input terminal e of the modulator circuit is coupled to a variable load, which is primarily capable of varying the real portion of the impedance that is effective between the output terminals b and c of the rectifier configuration GRb, as a function of their triggering. The modulator circuit Mod is triggerable with binary data through a data input terminal DT2.

With a configuration as shown in FIG. 1 it is assured that the energy transmission from the stationary part ST to the movable part BT is effected through the pair of coils L1$a$ and L2$a$, and that in the movable part BT the data that are input into the data input terminal DT2 are transmitted to the stationary part ST through the pair of coils formed of the repeating coils L1$b$ and L2$b$ and are evaluated by the evaluation circuit AS and furnished at the data output terminal DR1. As a result, the voltage furnished by the rectifier circuit GRa at the output terminals a and c is not amplitude-modulated, so that the voltage regulator SR need only stabilize stationary voltage fluctuations, or voltage fluctuations that only vary slowly. Any suitable voltage regulator, such as a series regulator, can be used as the voltage regulator SR. Half-wave or full-wave rectifiers, possibly with a buffer capacitor at the output, may be provided as the rectifier circuit GRa or GRb. The repeaters which are formed of the coils L1$b$ and L2$b$ can be constructed less expensively than the repeaters which are formed of the coils L1$a$ and L2$a$, because no power is transmitted. The rectifier circuit GRb can also be constructed less expensively than the rectifier circuit GRa, both in terms of the dimensioning of the components and the complexity of the circuit.

Figure 2:
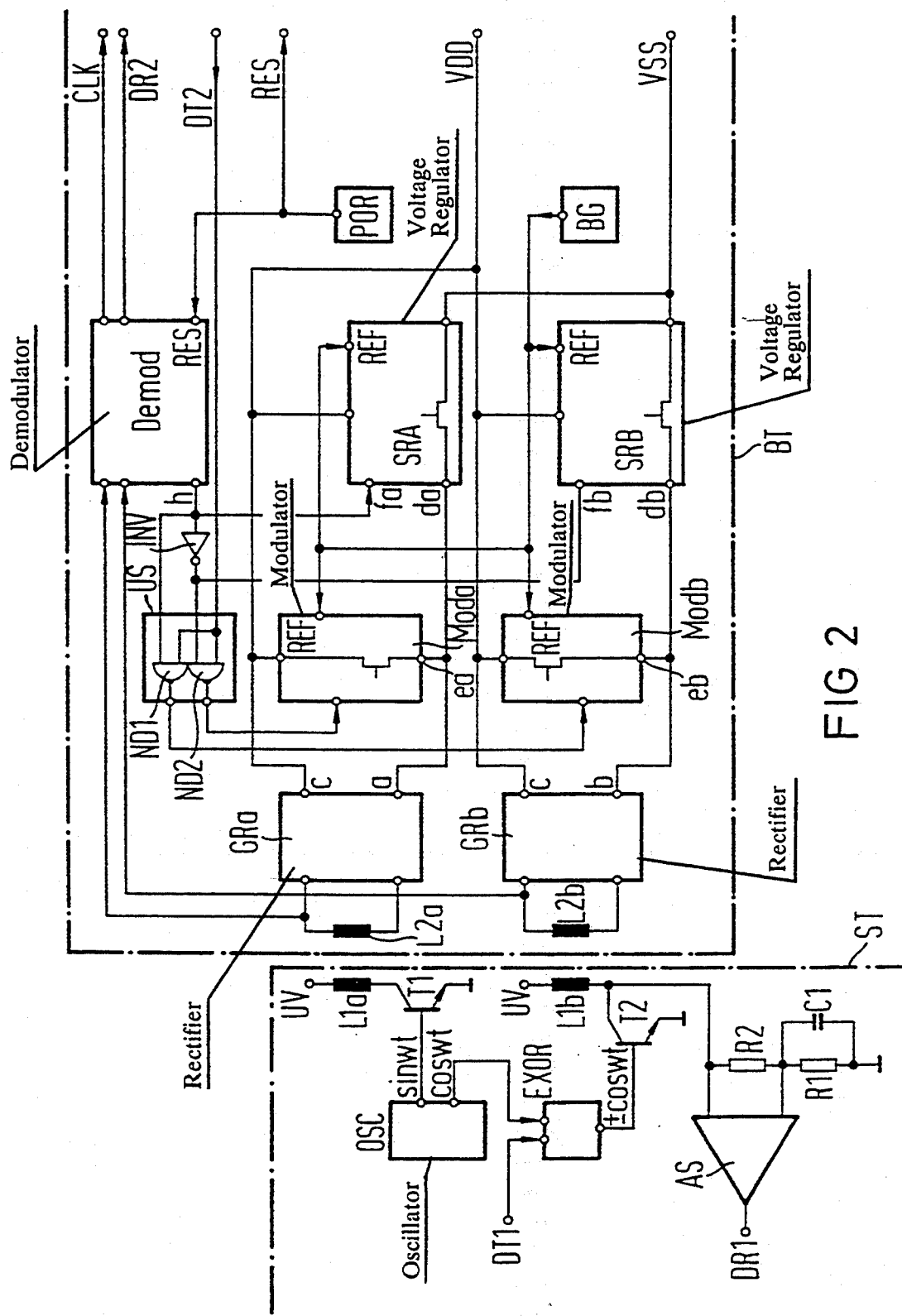
FIG. 2 is a basic circuit diagram of another embodiment of an apparatus according to the invention for contactless data and energy transmission, including a stationary part ST and a movable part BT, wherein the stationary part has two repeating coils L1a and L1b, and the movable part also has two repeating coils L2a and L2b, and in which the repeating coils of the movable part L2a and L2b are arbitrarily associatable with the repeating coils of the stationary part L1a and L1b, for forming coil pairs.

FIG. 2 shows the same stationary part ST as in FIG. 1. Each of the two repeating coils L2$a$, L2$b$ of the movable part BT which is also shown in FIG. 2, is followed by a respective rectifier circuit GRa, GRb, having a demodulator Demod, two voltage regulators or final control elements of a voltage regulator SRA, SRB, two modulators or modulator final control elements Moda, Modb, a power on/reset circuit POR and a reference voltage generator such as a bandgap circuit BG. The demodulator Demod, which typically includes a phase detector and a circuit for defining the logic level, has two inputs. One of the inputs of the demodulator Demod is connected to one terminal of the repeating coil L2$a$ and the other input thereof is interconnected to one terminal of the other repeating coil L2$b$. The demodulator circuit Demod has an output terminal CLK, which furnishes a clock signal for circuit elements following the transmission device of the movable part, such as logic circuits or a processor, as a function of the signal received by the repeating coils. The demodulator circuit Demod also has an output terminal DR2, at which the data which have been input through the data input terminal DT1 in the stationary part and modulated upward by the phase modulator formed of the EXCLUSIVE OR gate EXOR to the carrier frequency furnished by the oscillator OSC, are furnished in demodulated form. A reset input RES of the demodulator Demod is connected to the output of the power on/reset circuit POR. Each time the supply voltage of the movable part BT' is switched on, a level defining circuit of the demodulator is reset through the reset input RES, and the logic level of the signal received by the movable part is defined in the modulator circuit Demod. This takes place in dependence on whether the repeating coils forming a repeater are combined in the following groups: L1a +L2a and L1b+L2b, or L1a+L2b and L1b+L2a. The level defining circuit in the demodulator circuit Demod recognizes which repeating coil of the movable part BT is receiving the reference oscillation and which is receiving the information oscillation. A logic level is furnished at an output terminal h of the demodulator circuit Demod as a function thereof. Each of the two connection terminals of the repeating coil L2a is connected to a respective alternating current input of the rectifier circuit GRa. Each of the two connection terminals of the repeating coil L2b is connected to a respective alternating current input of the rectifier circuit GRb. The rectifier circuits GRa and GRb each have an output terminal c. The two output terminals c are interconnected and furnish the reference potential VDD for the electronic circuits contained in the movable part, such as the voltage regulators SRA and SRB, the modulators or modulator final control elements Moda, Modb, the power on/reset POR, and the reference voltage generator BG.

An output terminal a of the rectifier circuit GRa is connected to an input terminal da of the voltage regulator or voltage regulator final control element SRA and is also connected to an input terminal ea of the modulator circuit or modulator final control element Moda. An output terminal b of the rectifier circuit GRb is connected to an input terminal db of the voltage regulator or voltage regulator final control element SRB and is also connected to an input terminal eb of the modulator circuit or modulator final control element Modb. The output terminal of the voltage regulator or voltage regulator final control element SRA, or the output terminal of the voltage regulator or voltage regulator final control element SRB furnishes the voltage potential VSS for the electronic circuits of the movable part BT'. If the voltage regulators SRA, SRB are negative voltage regulators, then the reference potential VDD is higher than the supply potential VSS. If the voltage regulators SRA, SRB are positive voltage regulators, then the supply potential VSS is higher than the reference potential VDD. The output terminals a, b and c of the rectifier configurations GRa and GRb should be defined as a function thereof, by means of a suitable winding direction. As shown in FIG. 2, the input terminals ea and eb of the modulator circuits Moda, Modb are each coupled to a variable load, which can primarily vary the real portion of the impedance which is effective between the output terminals a and c of the rectifier configuration GRa, or between the output terminals b and c of the rectifier configuration GRb, as a function of their triggering. The modulator circuits or modulator final control elements Moda and Modb are triggerable, or in other words activated and deactivated, with binary data through a reversing switch device US.

A signal input of the reversing switch device US is acted upon by the binary data that are to be transmitted from the movable part BT' to the stationary part ST, through a data input terminal DT2. The binary data being input at the data input terminal DT2 are fed either to the control input of the modulator circuit Moda or to the control input of the modulator circuit Modb, depending on the signal that the demodulator circuit Demod furnishes to its output terminal h. To this end, the output terminal h of the demodulator circuit Demod is connected to one input of the reversing switch device US, as well as to the input of an inverter circuit INV. The output of the inverter circuit INV is connected to a further input of the reversing switch device US. In FIG. 2, one possible embodiment of the reversing switch device US in the form of two NAND gates ND1 and ND2 is shown. The signal output of one of these NAND gates ND1 forms one output of the reversing switch device US and is connected to the control input of the modulator circuit or modulator final control element Modb. The signal output of the NAND gate ND2 forms a second signal output of the reversing switch device US and is connected to the control input of the modulator circuit or modulator final control element Moda. The two NAND gates ND1 and ND2 are each constructed with two inputs. The first input of each of the two NAND gates ND1 and ND2 is interconnected with the data input terminal DT2. The second input of the NAND gate ND1 is connected to the output terminal h of the demodulator circuit Demod. The second input of the further NAND gate ND2 is interconnected with the output of the inverter circuit INV.

With this kind of circuitry it is assured that the data being input at the data input terminal DT2 are provided either for triggering the modulator or modulator final control element Moda or for triggering the modulator or modulator final control element Modb, and thus activating and deactivating Moda and Modb as a function of the logic levels furnished at the output terminal h of the demodulator circuit Demod.

The voltage regulator or voltage regulator final control element SRA shown in FIG. 2 can be activated and deactivated as a function of the logic level present at one input terminal fa of the voltage regulator or voltage regulator final control element. For instance, such a voltage regulator SRA is deactivatable by connecting the control input of its final control element to a fixed potential and thus reliably blocking it. The voltage regulator or voltage regulator final control element SRB is likewise equipped with such an input terminal fb enabling the activation and deactivation of this voltage regulator. The input terminal fa of the voltage regulator SRA is connected to the output terminal h of the demodulator circuit Demod. The input terminal fb of the voltage regulator or voltage regulator final control element SRB is connected to the output of the inverter circuit INV. Through the use of a suitable selection of the logic level, this assures that whenever the voltage regulator or voltage regulator final control element SRA is activated, the transmission of data from the movable part BT' to the stationary part ST will always take place through the modulator Modb, and whenever the voltage regulator SRB is activated, the transmission of data from the movable part BT' to the stationary part ST will always take place with the aid of the modulator circuit or modulator final control element Moda.

The circuit configuration of FIG. 2 enables an energy transmission from the stationary part ST to the movable part BT' as well as a bidirectional data transmission between these two parts of an apparatus according to the invention, regardless of whether the repeating coils L1a and L2a form one repeater and the repeating coils L1b and L2b form another repeater, as shown in FIG. 2, or the respective repeaters are formed by the coils L1a and L2b, on one hand, and L1b and L2a, on the other. The data input terminal DT2 can be connected to the input side of a modulator circuit, and the components Moda and Modb which are shown may include only modulator final control elements, or two modulator circuits Moda and Modb may be provided. Furthermore, the circuit elements SRA and SRB that are shown may each have a voltage regulator final control element which is preceded by a common voltage regulator, or two autonomous voltage regulators SRA and SRB may be provided.

An embodiment that is simple to manufacture includes a voltage regulator, for instance SRA, with a final control element connected between the input terminal da and the output terminal of the voltage regulator, and with a further final control element connected between the input terminal db and the output terminal of the voltage regulator. In this case it must be assured that the rectifier circuit GRa or GRb, through which data are being transmitted from the movable part BT to the stationary part ST at a given time, furnishes a maximum voltage at its output terminals a and c or b and c, as applicable, that is low enough to ensure that although the following final control element of the voltage regulator is made inactive because of the voltage rise of the amplitude modulation, the amplitude modulation need nevertheless not be stabilized by the voltage regulator. This can be achieved by providing that the modulator circuit Moda or Modb that acts on the repeating coils used for data transmission from the movable part BT to the stationary part ST places an upper limit on the voltage level at the output terminals of the rectifier circuit GRa or GRb preceding it, in such a way that the input voltage of the following voltage regulator final control element is only slightly higher than the sum of the output voltage of the voltage regulator circuit and the minimum voltage dropping across the voltage regulator circuit or the final control element of the voltage regulator.

If the modulator circuits Moda and Modb are constructed in such a way that they are suitable not only for controllable load variation but also for voltage limitation, then it is appropriate for the modulator circuit Moda or Modb that is not being used at the moment for data transmission from the movable part BT to the stationary part ST to limit the input voltage of the voltage regulator final control element SRA or SRB following it. If the modulator circuit Moda or Modb which aids in transmitting data from the movable part BT to the stationary part ST limits the voltage at the voltage regulator final control element SRA or SRB following it to a value so low that this voltage regulator final control element cannot furnish the required output potential VSS, then this output potential VSS of the voltage regulator configuration is furnished only by the final control element of the voltage regulator that is connected downstream of the repeating coil that does not take part in the transmission of data from the movable part BT to the stationary part ST.

If the modulator circuit used for data transmission from the movable part BT to the stationary part ST places a low load on the repeater preceding it and thus if a high but limited voltage is present at the output terminals of the rectifier circuit preceding it, and that voltage is just sufficient to enable the voltage regulator final control element following it to furnish the required output potential VSS, then this output potential VSS of the voltage regulator configuration is furnished by both final control elements, and both repeating coils of the movable part are involved in the energy transmission from the stationary part ST to the movable part BT. If, because of the logic level of the data to be transferred, the load of the repeater serving to transmit data from the movable part BT to the stationary part ST is higher because of the modulator circuit, then a potential that is lower than the output potential of the voltage regulator configuration is furnished at the input terminal of the final control element of the voltage regulator following this modulator circuit. In that case, the output potential VSS of the voltage regulator configuration is furnished only by the other final control element of the voltage regulator. The voltage regulator final control element having the overly low voltage level at the input is then inactive for the energy transmission.

In this kind of embodiment of the voltage regulator configuration, including one voltage regulator with two final control elements, in which at least the input voltage of one final control element is limited, it is unnecessary for the final control elements of the voltage regulator configuration to be activated or deactivated as a function of which of the repeating coils are combined into pairs.

For instance, if the voltage regulator is to furnish an output voltage VSS of 5 V, and if a typical series regulator is used as the voltage regulator, then the high level established by the modulator circuit at the input of the voltage regulator final control element should not exceed 6.5 V. The associated low level may be approximately 4 V, but this is not critical.

Like the voltage regulator circuits SRA and SRB which are shown, the modulator circuits Moda and Modb shown in FIG. 2 may each be equipped with a reference voltage input REF, which is acted upon by the output signal of a reference voltage generator, for instance a band gap circuit BG.

FIG. 2 shows one possible practical embodiment of an apparatus according to the invention for contactless data and energy transmission, in which one of the voltage regulators SRA or SRB in the movable part following the two repeating coils is activated, depending on which of the two repeating coils of the movable part receives the reference oscillation and which receives the information oscillation, and the modulator circuit Modb or Moda following the other repeating coil is triggered by the data to be transmitted from the movable part BT' to the stationary part ST. An advantage of this type of circuit is that the limit frequency of the required reversing switch device US is defined only by the maximum allowable transmission rate of the data fed in at the data input terminal DT2. The same technical effect that is attained with the circuit configuration of FIG. 2, is also attainable with the circuit configuration of FIG. 1, if a reversing switch device is additionally provided that connects the output terminal a of the rectifier configuration GRa to the input terminal d of the voltage regulator SR and connects the output terminal b of the rectifier configuration GRb to the input terminal e of the modulator circuit Mod, in the event that the repeating coil L2a receives the reference oscillation and the repeating coil L2b receives the information oscillation, and which then connects the output terminal a to the input terminal e and connects the output terminal b to the input terminal d, if the repeating coil L2a receives the information oscillation. However, the limit frequency of a reversing switch device which is required for this purpose but is not shown in the drawings is defined by the carrier frequency or in other words the signal frequency of the oscillator OSC in the stationary part ST, and thus is typically above the limit frequency of a reversing switch device US of FIG. 2.

Apparatuses for contactless data and energy transmission according to the invention can be used in both access systems and data exchange systems. In this context, access systems are those that recognize the holder of the movable part BT of an apparatus for contactless data and energy transmission according to the invention as being authorized to have access and that enable access by that person either to data or to premises, or which enable such a person to use equipment of some kind.

In this context, data exchange systems are systems in which a data carrying medium is connected to both the stationary part ST and the movable part BT of the apparatus for contactless data and energy transmission, and a data processing unit is connected to at least the stationary part ST.

The movable part BT may be realized in the form of a key. In access systems, the stationary part is then in the form of a lock. In data exchange systems, the stationary part is in the form of a read/write unit, possibly coupled to a data processing unit.

The movable part of an apparatus according to the invention for contactless data and energy transmission may also be in the form of a chip card. In this case, the stationary part is part of a reading unit or read/write unit.

We claim:

1. An apparatus for contactless data and energy transmission, comprising:
    a stationary part including
        a first coil and a second coil,
        an oscillator having a first oscillator output coupled to said first coil to provide a reference signal and a second oscillator output,
        a phase modulator coupled to said second oscillator output and said second coil to provide an information signal;
        evaluator means connected to and being activated by said second coil to evaluate amplitude variations in the information signal provided by the second coil to provide a corresponding data signal,
    a movable part including
        a third coil and a fourth coil,
        first rectifier means connected to said third coil and second rectifier means connected to said fourth coil, each of said rectifier means having first and second inputs and first and second outputs,
        said first output of said first rectifier means being connected to said first output of said second rectifier means and forming a reference potential clamp,
        a phase demodulator having a first demodulator input connected to said third coil, a second demodulator input connected to said fourth coil, and at least one control output for outputting a signal corresponding to the relative phase between the reference signal and the information signal,
        first and second voltage regulators each having an input, an output, a control output and a reference potential connection, said outputs of said first and second voltage regulators being connected to one another and forming a supply voltage clamp,
        first and second amplitude modulators each having a reference potential connection, an output and a control input,
        reversing switch means having first and second inputs and first and second outputs for connecting a data signal present at one of said first and second inputs to one of said outputs in dependance on a signal at the other of said first and second inputs,
        said reference potential connections of said first and second voltage regulators and of said first and second modulators being connected to said reference potential clamp,
        said second output of said first rectifier means being connected to said input of said first voltage regulator and to said output of said first amplitude modulator, said second output of said second rectifier means being connected to said input of said second voltage regulator and to said output of said second amplitude modulator, said control output of said phase modulator being connected to said control input of said first voltage regulator,
    an invertor connected between said control output of said phase demodulator and said control input of said second voltage regulator,
        said control output of said phase demodulator being connected to said first input of said reversing switch means, said first output of said reversing switch means being connected to said control input of said first amplitude modulator, and said second output of said reversing switch means being connected to said control input of said second amplitude modulator, said second input of said reversing switch means being means for receiving a data signal, said stationary part and said movable part together forming coupling means for coupling
        said first and third coils to form a coil pair and said second and fourth coils to form a coil pair, and for deactivating said first amplitude modulator and said second voltage regulator, or
        said first and fourth coils to form a coil pair and said second and third coils to form a coil pair, and for deactivating said second amplitude modulator and said first voltage regulator, and that
        the apparatus is enabled to simultaneously transmit data from said stationary part to said movable part by phase modulation and from said movable part to said stationary part by amplitude modulation;
    whereby energy is transmitted only with the coil pair including said first coil and data are received only with the coil pair including said second coil.

2. Apparatus according to claim 1, wherein said stationary and movable parts are parts of a data exchange system and said movable part is part of a key.

3. Apparatus according to claim 1, wherein said stationary and movable parts are parts of a data exchange system and said movable part is part of a chip card.

4. Apparatus according to claim 1, wherein said stationary and movable parts are parts of an access system and said movable part is part of a key.

5. Apparatus according to claim 1, wherein said stationary and movable parts are parts of an access system and said movable part is part of a chip card.

6. The apparatus according to claim 1, wherein said first and second voltage regulators have control elements associated with a respective one of said third and fourth coils of said movable part.

* * * * *